United States Patent

[11] 3,566,130

[72] Inventors Ralph Edward Aldrich
Woburn;
Paul John Caruso, Bedford, Mass.
[21] Appl. No. 824,997
[22] Filed May 15, 1969
[45] Patented Feb. 23, 1971
[73] Assignee Itek Corporation
Lexington, Mass.

[54] CONTRAST CONTROL BY ADDITION OF SPATIALLY INVARIANT MODULATION TO SPATIALLY VARYING MODULATION REPRESENTATIVE OF AN IMAGE
30 Claims, 12 Drawing Figs.

[52] U.S. Cl....................................... 250/213,
250/225, 350/150
[51] Int. Cl....................................... H01j 31/50,
G02f 1/18, G02f 1/26
[50] Field of Search........................................ 250/213,
225; 350/150

[56] References Cited
UNITED STATES PATENTS
3,449,583  6/1969  Eden ............................ 250/213
3,499,157  3/1970  Satake et al. ................. 250/213

*Primary Examiner*—Archie R. Borchelt
*Assistant Examiner*—T. N. Grigsby
*Attorneys*—Homer O. Blair, Robert L. Nathans and David E. Brook ABSTRACT: Apparatus is disclosed for varying the contrast of an image by exposing a photoconductive medium associated with an electro-optic medium to the image to vary the conductivity of the photoconductive medium and the intensity of an electric field associated with the mediums in a pattern representative of the image, uniformly modulating radiation subject to modulation by an electro-optic characteristic of the electro-optic medium in a pattern representative of the image, detecting the modulation of the radiation, and producing a radiation pattern representative of the image with modified contrast.

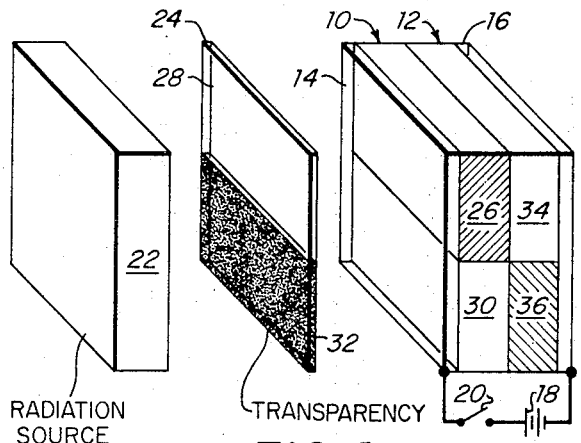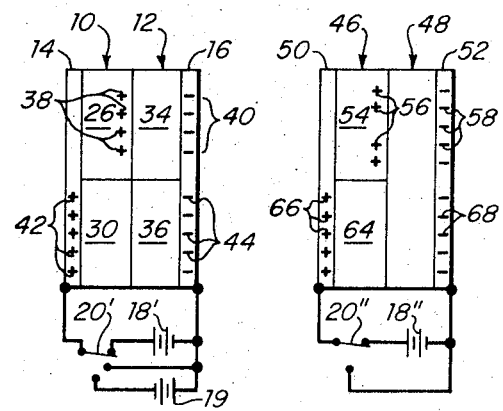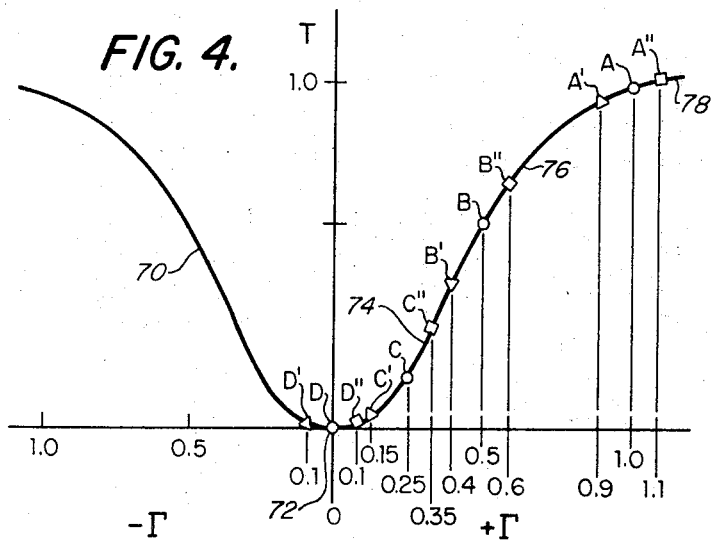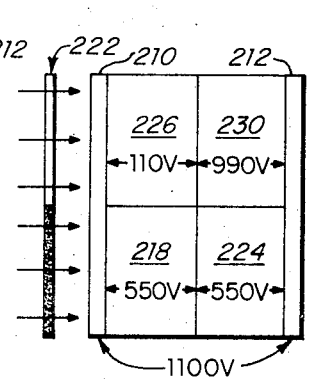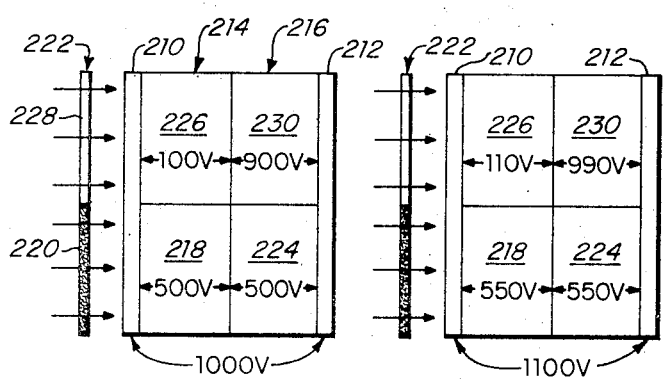

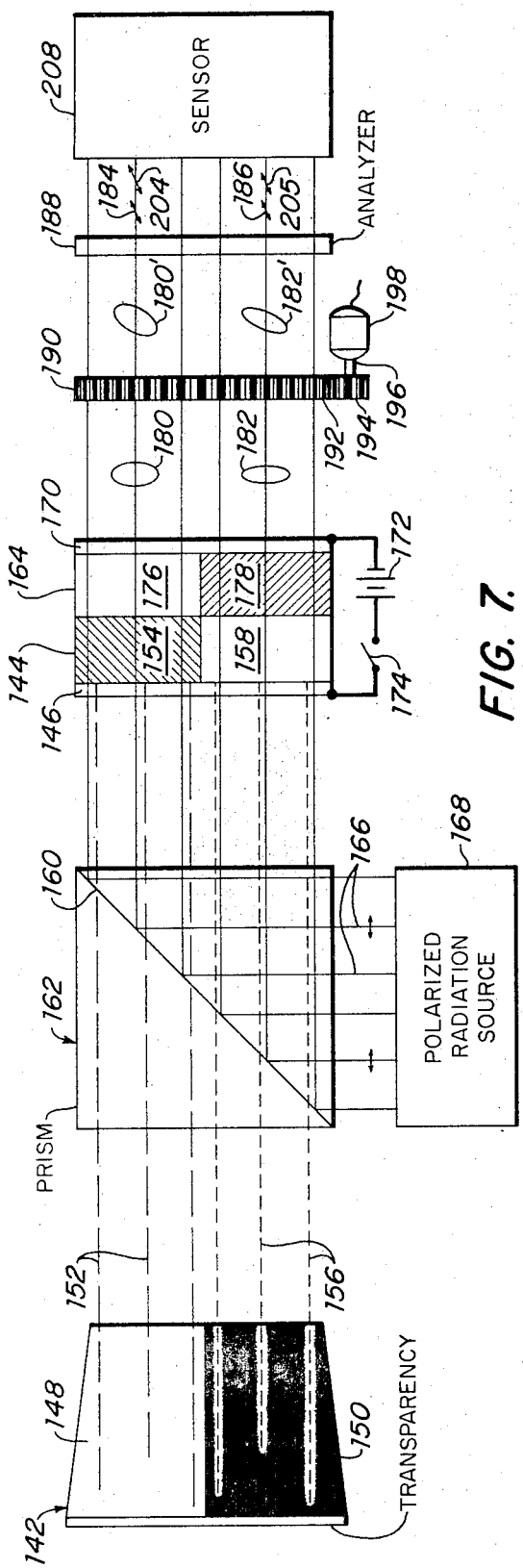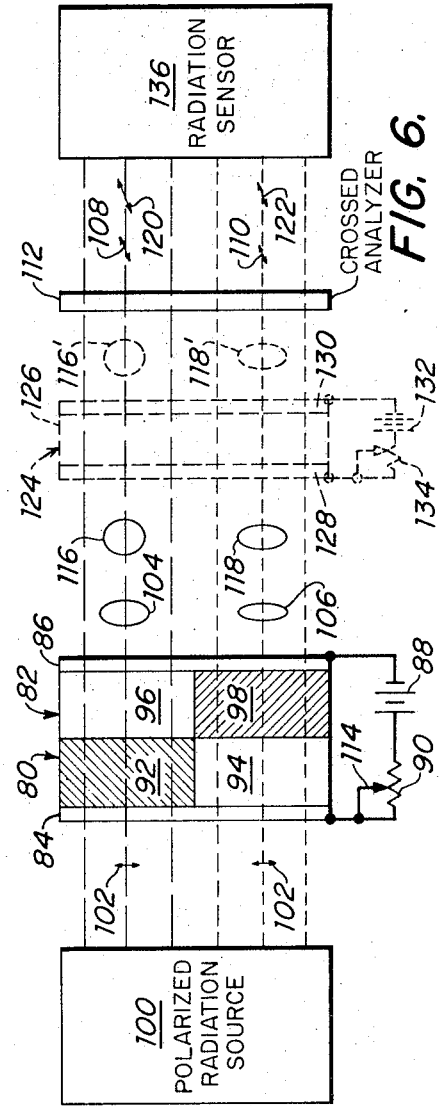

CONTRAST CONTROL BY ADDITION OF SPATIALLY INVARIANT MODULATION TO SPATIALLY VARYING MODULATION REPRESENTATIVE OF AN IMAGE

CHARACTERIZATION OF INVENTION

The invention is characterized in a method of varying the contrast of an image comprising providing at an electro-optic medium, having a characteristic that varies as a function of an associated electric field, an electric field whose intensity varies as a function of an image whose contrast is to be modified, uniformly modulating radiation subject to modulation by the electro-optic medium, and detecting the modulation imposed on the radiation and producing a pattern of radiation representative of the image with contrast modified.

BACKGROUND OF INVENTION

This invention relates to modification of the contrast of an image, and more particularly to continuously variable modifying of image contrast by uniformly modulating radiation subject to modulation by an electro-optic medium in a pattern representative of the intensity pattern of the image.

Contrast of a photographic image may be increased or decreased by proper selection of the photographic film which is to be exposed to the image or by use of masks. To increase the contrast of an image by the former technique, the selected film should exhibit a D/Log E curve which provides large differences in print density for small differences in exposure levels. Similarly, to decrease the contrast of an image the selected film should exhibit a D/Log E curve which provides only small differences in print density for large differences in exposure levels. Contrast of an image may also be varied by inserting a mask between the source of an image and the film. For example, image contrast may be decreased by placing a positive transparency of the image between a negative transparency of the image and a light source. This attenuates the bright portions of the image more than the dark portions and produces an image of intermediate light levels. Conversely, a second negative transparency of the image may be placed between the primary negative transparency of the image and a light source, whereby the light through the dense portions of the negatives is attenuated more than the light through the less dense portions. Thus to vary the contrast of a photographic image, one combination of exposing light and films must be chosen; if the resulting image does not have the desired contrast a new combination must be selected. Similarly, when masks are used, if the first mask and exposure level does not produce a satisfactory image a new exposure level and/or mask must be tried. In both techniques for varying the contrast, the presence of more than one transparency causes an alignment problem.

SUMMARY OF INVENTION

Thus it is desirable to have available a method and means for continuously variable image contrast modification.

It is also desirable to have available a method and means for electro-optically varying the contrast of an image.

It is also desirable to have available a method and means for optically varying the contrast of an image.

It is also desirable to have available a method and means for modifying the contrast of an image by uniformly, modulating radiation, which is subject to electro-optically imposed modulation in a pattern representative of the intensity pattern of the image without the presence of masks and attendant alignment problems.

The invention may be accomplished by exposing a photoconductive medium to an image whose contrast is to be modified. The photoconductive medium is associated with an electro-optic medium and an electric field is applied across the mediums. The conductivity of the photoconductive medium, thus the electric field at the electro-optic medium, and an electro-optic characteristic of the electro-optic medium vary in a pattern representative of the image. Radiation subject to the electro-optic medium is modulated by that characteristic of the electro-optic medium in a pattern representative of the image and is also subject to means for uniformly modulating it to modify the contrast of the radiation pattern produced.

DISCLOSURE OF PREFERRED EMBODIMENT

Other objects, features and advantages will occur from the following description of preferred embodiments and the accompanying drawings, in which:

FIG. 1 is an axonometric diagrammatic view showing storage of an image in an electro-optic storage device.

FIG. 2 is a diagrammatic view of the charge distribution in a device in which the electro-optic medium and photoconductive medium are contained in separate layers.

FIG. 3 is a diagrammatic view similar to that of FIG. 2 wherein the electro-optic medium and photoconductive medium are contained in one layer accompanied by a blocking layer.

FIG. 4 is a plot of transmissivity of a crossed analyzer versus retardation imposed on radiation analyzed by it.

FIGS. 5a, b, c are charts showing the nonlinear variation of relative retardation of radiation subject to an electro-optic birefringent medium with variations in applied voltage.

FIG. 6 is a diagrammatic view of a storage-type image contrast modifying apparatus according to this invention.

FIG. 7 is a diagrammatic view of another embodiment of the invention similar to that shown in FIG. 6 operable as a real-time device with the object shown in perspective.

FIG. 8 is a diagrammatic view showing the distribution of an applied voltage across a variable contrast device according to this invention while the device is exposed to a radiant image.

FIG. 9 is a view similar to that of FIG. 8 showing distribution of an increased voltage.

FIG. 10 is a view similar to FIG. 9 absent the radiant image.

In one form of the invention an image is projected onto a photoconductor layer disposed adjacent to an electro-optic layer between two transparent electrodes. A battery in series with a variable resistor is connected to the electrodes for creating an electric field between the electrodes across the layers. The image incident on the photoconductor layer varies the conductivity of that layer in a pattern identical to the intensity pattern of the image. In areas corresponding to high intensity portions of the image the conductivity is high and in areas corresponding to low intensity portions of the image conductivity is low. The electro-optic layer may exhibit electrically induced birefringence so that in areas where the conductivity of the photoconductor layer is high the electric field intensity across the electro-optic layer is high and the birefringence is more pronounced than in areas where the conductivity of the photoconductor layer is low and the electric field intensity across the electro-optic layer is low. In storage devices the electric field established at the electro-optic layer in a pattern corresponding to the pattern of variations in conductivity of the photoconductor layer is preserved and is present even after the exposure of the photoconductor to the image has ceased. The plane polarized image radiation transmitted by the electro-optic layer becomes elliptically polarized by the birefringence of the electro-optic layer to an extend dependent upon the intensity of the electric field at the portion of the electro-optic layer traversed by the radiation. The retardation between the birefringent axes, thus the eccentricity of the elliptical field varies as a function of the birefringence of the electro-optic layer. Initially, at zero retardation the output radiation field may be parallel to the input radiation field. As birefringence increases the retardation increases and produces an elliptical field having a component parallel and nearly equal to the field of the plane polarized image radiation, and a component orthogonal to the image radiation polarization plane and very much smaller than the parallel component. As the birefringence increases the parallel component decreases and the orthogonal component increases. At 90° retardation between the radiation traveling the two birefringent axes, the field is circular.

An analyzer, such as a plane polarizer oriented orthogonally to the plane of polarization of the image radiation, located in the path of radiation from the electro-optic layer detects or transmits only the orthogonal component of the elliptical field. Since the modulation of the intensity of that component is a function of the induced birefringence of the electro-optic layer, the pattern of radiation produced at the analyzer is a representation of the radiant image incident on the photoconductor layer.

The contrast of the radiation pattern produced at the analyzer by a storage device may be modified by uniformly varying the induced birefringence of the electro-optic layer or of another electro-optic layer by varying the intensity of the electric field across it. Uniformly varying the electric field across an electro-optic layer varies the retardation imposed by the birefringent axis of the layer thereby varying the magnitude of the orthogonal component of the elliptical field which is then passed by the crossed analyzer. An equal or uniform increase or decrease to the electric field intensity and retardation changes the transmissivity ratio between points of differing densities or intensities. As a result the contrast between those points is changed.

The contrast of the radiation pattern produced at the analyzer may also be modified optically by rotating either the electro-optic layer or the analyzer or both relative to each other about the optical axis of the device. Such rotation uniformly varies the retardation of the radiation submitted to those elements causing a change in the differences of intensity between points of the image in the same way as when the retardation is varied by varying the voltage. Alternatively, an optical retardation element such as a half-wave plate or a Babinet-Soleil compensator may be introduced into the system and rotated to similarly vary the retardation of the image radiation and the intensity of the component of the field transmitted by the analyzer.

The polarized radiation which is subject to modulation by the birefringence of the electro-optic layer in a pattern representative of the image, and to uniform modulation by optical or electro-optical means may be provided simultaneously with the image radiation or may be provided at a later time to operate on the stored image. If the uniform modulation is imposed by rotating the components relative to each other or by varying the voltage on an electro-optic birefringent medium in addition to the electro-optic medium associated with the photoconductive medium, then the device may be operated as a real time device wherein the radiant image whose contrast is to be modified is present simultaneously with the polarized radiation that will be modulated. However, if the uniform modulation is imposed by varying the voltage across the electro-optic medium associated with the photoconductive medium, the device may not be operated as a real-time device as subsequently explained, with references to FIGS. 8, 9, 10. Able to have their contrast modified by means of this invention are images presented as electric fields such as provided by a device having an electro-optic layer of e.g. KDP, DKDP, lithium niobate combined with a photoelectret layer of e.g. amorphous ZnS, ZnSe, ZnTe, CdS; or a device having a layer containing both an electro-optic and photoelectret medium e.g. cubic (100) ZnS, ZnSe, ZnTe; combined with a blocking layer e.g. polystyrene, $SiO_2$; or a device having a layer containing an electro-optic and a ferroelectric medium e.g. bismuth titanate combined with a layer of an amorphous photoconductor and images presented as momentary electric fields provided by devices having a layer containing a photoconductor and electro-optic medium, e.g. CdS, KDP. The storage devices may be distinguished from the momentary or real-time devices by presence of a blocking medium for preventing charge leakage to maintain the electric field for a substantial period of time. The blocking medium may be a separate dielectric layer or may be an electro-optic medium which also functions as a blocking layer.

The analyzer produces a radiation pattern which is of high intensity where the radiant image is of high intensity and is of low intensity where the radiant image is of low intensity. If the analyzer is arranged with its plane of polarization parallel to that of the input radiation, an inverted pattern of the image is produced. An interface such as a lens system may be used for viewing the radiation pattern produced at the analyzer or projecting it to recording or other types of equipment.

Birefringence is not the only characteristic which may be used to modulate radiation as a function of the electric field applied to the electro-optic layer. For example, the electro-optic layer may be combined with various other optical structures to sense the change in the properties of reflection, refraction, or spectral response of the layer as the index of refraction changes in response to an applied electric field.

Although the photoconductive medium and electro-optic medium are described as separate materials and layers, the characteristics of both may be contained in a single layer or material. In such an arrangement the portions of the photoconductive medium struck by high intensity areas of the radiant image become highly conductive and decrease the field across the electro-optic medium because both mediums are contained in the same layer. This is in contrast to the arrangement in which the mediums are in separate layers.

The electric field whose intensity varies as a function of the image whose contrast is to be modified is not producible only by means of a photoconductive medium; it is also producible only by means of a photoconductive medium; it it is also producible by other means such as a charge-retaining plate or dielectric tape.

In FIG. 1 there is shown a device for storing an image whose contrast is to be modified. A photoconductor layer 10 whose conductivity varies as a function of the intensity pattern of radiation incident on it is combined with an electro-optic-birefringent layer 12 whose birefringence varies as a function of the intensity of an electric field applied to it. Layers 10 and 12 are disposed between a pair of electrodes 14, 16 energized by battery 18 in series with switch 20. Radiation from source 22 transmitted by transparency 24 is incident on layer 10 and varies the conductivity thereof in a pattern similar to that contained on transparency 24: section 26 of layer 10 struck by high intensity radiation from less dense portion 28 of transparency 24 has higher conductivity than section 30 of layer 10 struck by low intensity radiation form more dense portion 32 of transparency 24. As a result the electric field across section 34 of layer 12 is more intense than that across section 36, and the birefringence of section 34 is more pronounced than that of section 36.

The charge distribution across layers 10 and 12 is shown in FIG. 2 where the positive charges 38 attracted by negative charges 40 have penetrated highly conductive section 26 of layer 10 to the boundary of section 34 of layer 12. Positive charges 42 though attracted by negative charges 44 have been unable or able only to a small extent to penetrate section 30 of layer 10 which has remained at low conductivity. When switch 20' is thrown to its shorting position positive charges 42 and negative charges 44 in electrodes 14 and 16 are removed whereas the charges 40 in electrode 16, because of the attraction of positive charges 38 trapped in layer 10, distribute themselves on electrodes 14 and 16 in opposition to charges 38 so that there is a voltage across both layers 10 and 12, and remain for a period of time dependent upon the storage ability of the device. If layer 12 functions as an electrically blocking layer as well as an electro-optic medium such as where that layer is a ferroelectric material, the storage capability may be substantial. If layer 12 does not function as a blocking layer then the device may be best suited for real-time operation. The image stored in the electric field associated with layers 10 and 12 may be reversed, i.e. a positive image converted to a negative or vice versa by connecting a battery 19 of reversed polarity across the layers after storage is complete.

The charge distribution which may be established by the arrangement of FIG. 1 in a device wherein the photoconductive and electro-optic mediums are contained in one layer 46 associated with a blocking layer 48 between two electrodes 50, 52 energized by battery 18″ in series with switch 20″ is shown in FIG. 3. Layer 46 is an electro-optic photoelectret which retains an electric field placed in it by a radiation pattern. Hole and electron migration occurs in radiation struck section 54 causing positive charges 56 to migrate toward the negative charges 58 on electrode 52. In section 64 where the incident radiation is of low intensity little or no such migration occurs. When switch 20″ is thrown to the shorting position, charges 66, 68 are removed leaving the internal field in section 54 as the dominant field.

As the strength of the field across the electro-optic-birefringent layer increases its birefringence increases resulting in an increase in the retardation established between the radiation traveling along the birefringent axes. In FIG. 4 there is shown the variation of transmissivity of radiation by a crossed analyzer as a function of the retardation imposed on the radiation. The retardation $\Gamma$ has been labeled plus and minus to distinguish the two different directions of retardation; positive retardation is that which provides an elliptical field having clockwise rotation and negative retardation is that which provides an elliptical field of counterclockwise rotation. In an electro-optic-birefringent material the polarity of the applied electric field and the sign of the electro-optic constant determines the sign of the retardation and direction of rotation of the elliptical field. It is apparent from curve 70, FIG. 4, that increasing retardation, in either direction, by increasing the component of the elliptical field orthogonal to the plane of the polarized input radiation, increases the intensity of the radiation transmitted by the crossed analyzer.

The manner in which the contrast of an image may be varied by varying the voltage may be understood with reference to the charts of FIG. 5a, b, c. In FIG. 5a there is a listing of four points of an image A, B, C, D stored in an electric field associated with an electro-optic device in which the electro-optic layer and the photoconductor layer are separate. A is the point of highest intensity and points B, C, D are points of progressively lower intensity. At point A where the strongest radiation was incident on the photoconductive medium, the electric field across the electro-optic medium is V; at point B where the radiation intensity was less, the intensity of the electric field is only 0.5V; at point C the electric field intensity is 0.25V; and at point D where little or no radiation was incident on the photoconductive medium the electric field across it is zero or nearly zero. The retardation established at those points in the electro-optic medium is $\Gamma$, 0.5$\Gamma$, 0.25$\Gamma$ and 0. The positions on curve 70 of those points is shown in FIG. 4 by the circular ⊙ indicators. If it is desired to increase the contrast of points A, B, C, D, the voltage V may be decreased by 10 percent of V or 0.1V volts, FIG. 5b. This decrease leaves the portions of the electro-optic medium corresponding to points A, B, C, D with 0.9V, 0.4V, 0.15V, and −0.1V volts across them respectively. Now those points, shown as A′, B′, C′, D′ with triangular △ indicators in FIG. 4, have retardation of 0.9$\Gamma$, 0.4$\Gamma$, 0.15$\Gamma$, and −0.1$\Gamma$. Whereas the retardation at A was twice that at B, four times that at C and "infinitely" greater than that at D, i.e. 1.0: 0.5: 0.25:0, the ratio for the same points designated A′, B′, C′, D′ is now 0.9:0.4:0.15:−0.1 the relative intensity of those points has been increased with the exception of the point D or D′ which is actually less contrasted because the −0.1$\Gamma$ has the same transmissivity as the +0.1$\Gamma$. An increase of V by 10 percent of V or 0.1V volts, FIG. 5c, similarly changes the 1:0.5:0.25:0 ratio of points A, B, C, D to a 1.1:0.6:0.35:0.1 ratio, points A″, B″, C″, D″ indicated as squares □ in FIG. 4. The retardation of A″ is now less than twice that of B″, less than four times that of C″ and less than infinitely greater than D″. In this case the contrast has been decreased between the points. This invention may also utilize the nonlinearities in the transmissivity curve, FIG. 4, to further vary the contrast of an image.

As depicted in FIG. 4, and more fully explained in the booklet Electro-Optic Light Modulator and Supplementary Electronics, Baird-Atomic, Inc., Nov. 1965, Cambridge, Mass., in the area of curve 70 from point 72 at the origin to point 74 the transmissivity T varies approximately as a function of the voltage or retardation squared: $T \propto V^2$ or $(\Gamma)^2$. In the area from point 74 to 76 transmissivity T varies approximately linearly with voltage and retardation and in the area from 76 to 78 transmissivity T varies approximately as a function of $(1-\Gamma^2)$. Thus by selecting the proper voltage range, the contrast may be varied in accordance with the variation of any one or more of the three areas of curve 70.

Apparatus for varying the contrast of an image in accordance with this invention, FIG. 6, may include a photoconductor layer 80 combined with an electro-optic-birefringent blocking layer 82 between electrodes 84, 86 energized by battery 88 in series with variable resistor 90. Layer 80 has been subjected to the same radiant image as provided in FIG. 1 and has that image stored in it. During exposure, section 92 was of higher conductivity than section 94. The conductivity pattern of layer 80 produced across layer 82 an electric field which is more intense in the area of section 96 and less intense in the area of section 98. The electric field was stored in the device so that even after the exposure ceased and sections 92 and 94 returned to their normal, dark resistance of conductivity, the electric field remained. Thus, the induced birefringence of layer 82 is greater in section 96 than in section 98. Radiation from source 100 polarized as indicated by arrows 102 is subjected to electro-optic layer 82 through electrodes 84, 86 and layer 80. The elliptical field 104 of the radiation emerging from section 96 in which the birefringence is more pronounced has a larger orthogonal component than the elliptical field 106 of radiation emerging from section 98. These orthogonal components 108, 110 may be detected by analyzer 112 whose axis of polarization is crossed with (orthogonal to) that of the polarized input radiation, arrows 102. The radiation emerging from analyzer 112 produces an intensity pattern representative of the image.

The contrast of the image may be varied by varying the electric field across electrodes 84, 86 by moving contact 114 of variable resistor 90. For the pattern of the electric field intensity stored in the layers 80, 82 is initially a replica of the radiant image incident on the photoconductor layer. When, then the electric field is uniformly decreased or increased, the ratio of the field strength at any particular point in the electric field to the field strength at another point is changed. This change in relative field strengths between two such points results in a change in the difference of birefringence between the two points, and in a change in the difference of retardation produced at those two points. Since the change in the difference of retardation also similarly affects the change in the difference in the eccentricity of the elliptical radiation field, there is a change in the difference of intensity of radiation emerging from those two points as viewed through crossed analyzer 112.

Therefore, where the electric field across electrodes 80, 82 has been increased, the elliptical field 116 is less eccentric than elliptical field 118 by a lesser degree than elliptical field 104 is less eccentric than elliptical field 106, even though elliptical fields 116, 118 are less eccentric than elliptical fields 104, 106, respectively. Although when viewing through analyzer 112 intensity vector 120 is greater than intensity vector 108, and intensity vector 122 is greater than the intensity vector 110, the proportionate difference between vectors 120 and 122 is less than that between vectors 108, 110, thus the contrast is decreased by the increased voltage.

Alternatively, contrast may be modified electro-optically by device 124 having second electro-optic layer 126 subject to an electric field across electrodes 128, 130 by battery 132 in series with variable resistor 134. Device 124 operates in the same manner as layer 82 to vary the modulation of the radiation field to produce elliptical fields 116′, 118′ from fields 104, 106. Device 124 may be placed ahead of layers 80 and 82 as well as in the position shown in FIG. 6. That is, the uniform modulation imposed on the radiation subject to modulation imposed by the electro-optic medium in a pattern representative of the image incident on the photoconductive medium, may be imposed either before or after that radiation is subject to that pattern of modulation. An interface device 136 such as a radiation sensor or a lens system may be used for viewing the radiation pattern or projecting it to recording or other types of equipment.

In FIG. 7 there is shown an object, plate 142, whose image is projected onto the surface of photoconductor layer 144 through transparent electrode 146. Since the upper portion 148 of plate 142 is brighter than its lower portion 150, the radiation 152 from upper portion 148 incident on layer 144 in the area proximate section 154 is of higher intensity than the radiation 156 from lower portion 150 incident on layer 144 in the area proximate section 158. The conductivity of section 154 is therefore increased more than the conductivity of section 158 in a pattern similar to that of the image of plate 142. All of the radiation 152, 156 passing to layer 144 is transmitted by boundary 160 of prism 162 to photoconductor layer 144 but is not transmitted through birefringent electro-optic layer 164. Plane polarized radiation 166 from source 168 is reflected from boundary 160 and transmitted by electrode 146, layers 144 and 164, and electrode 170.

Battery 172 provides a uniform electric field between electrodes 146 and 170 across layers 144 and 164 when switch 174 is closed. The conductivity pattern of layer 144 produces across layer 164 an electric field which is more intense in the area of section 176 and less intense in the area of section 178. Thus the induced birefringence in section 176 is greater than that in section 178. The elliptical field 180 of the radiation transmitted by section 176 in which the birefringence is more pronounced has a larger orthogonal component than the elliptical field 182 of the radiation from section 178. These orthogonal components 184, 186 may be detected by analyzer 188 whose axis of polarization is orthogonal to that of radiation 166. The radiation transmitted by analyzer 188 produces an intensity pattern representative of the image.

The contrast of the radiation pattern may be modified by increasing or decreasing the intensity of the components 184, 186 transmitted by the analyzer 188. Contrast modification may be accomplished optically by rotating analyzer 188 and layer 164 relative to one another or by rotating an elliptical or circular polarizer plate 190 driven by a gear 194 on shaft 196 of motor 198. Plate 190, which may be a half-wave plate, may be rotated to rotate the elliptical fields 180, 182 to the positions shown at 180', 182' so that their cross components detectable by the analyzer 188 are increased. The variation in the rotational position of plate 190 which provides a uniform increase or decrease in the retardation imposed on the radiation from electro-optic layer 164 already retarded in a pattern representative of the intensity pattern incident on photoconductor layer 144, operates in the same manner as a variation in voltage, FIG. 5a, b, c, to vary the contrast of the image. For example, if by rotation of plate 190 a uniform retardation of 0.1Γ is added to the retardation pattern of radiation from layer 164, the effect is similar to that caused by the increase of voltage by 0.1V volts as discussed in relation to FIGS. 4 and 5c. Plate 190 may be placed ahead of layers 144 and 164 as well as in the position shown. An interface device 208, similar to device 136 may be used. Switch 174 may be used to deenergize the electric field applied to electrodes 146 and 170 after layer 144 has been exposed to an image when layer 164 is an electrical blocking layer and the device is operated as a storage device, as described supra.

The apparatus of FIG. 7 is shown performing a real time operation, i.e. the original image is present while its contrast is being varied. The apparatus of FIG. 6 may also be operated as a real-time device provided that the uniform variation in retardation is applied by electro-optic device 124. For any of the devices according to this invention to operate as a real time device the uniform retardation imposed on radiation subject to retardation in a pattern representative of the image incident on the photoconductive medium should be applied by or through means external to the electro-optic medium which establishes the modulation pattern representative of the image. The external means for uniformly varying modulation may be means for providing relative rotation between that electro-optic medium and its analyzer, a third element such as plate 190 or electro-optic device 124.

Variation of the voltage across the electro-optic medium that is combined with the photoconductive medium while the image is incident on the photoconductor is ineffective to vary contrast because the increased or decreased electric field redistributes in the same ratios as with the initial voltage: there is no change in the difference of voltage ratios between two points of the image of different intensity.

This may be seen with reference to FIGS. 8, 9, and 10. In FIG. 8 with 1,000 volts applied to electrodes 210, 212 that voltage is distributed across photoconductor layer 214 and electro-optic layer 216. Section 218 of layer 214, which receives little or no radiation through the dark portion 220 of transparency 222, is subject to 500 volts as is adjacent section 224 of layer 216. Section 226 of layer 214 which receives strong radiation through lighter portion 228 of transparency 222 becomes highly conductive and receives only 100 volts while adjacent section 230 of layer 216 receives 900 volts.

When the voltage across electrodes 210, 212 is raised to 1,100 volts with the image of transparency 222 still present, FIG. 9, the 1,100 volts distributes itself in the same ratio as did the 1,000 volt field: in FIG. 8 the ratio of voltages of sections 226 and 230 is 1: 1:9 and it still is in FIG. 9; in FIG. 8 the ratio of voltages of sections 218 and 224 is 1:1 and it still is in FIG. 9. When, however, the image radiation is not present but the pattern is stored, the additional 100 volts, FIG. 10, distributes equally 50 volts to each section of each layer. As a result the voltages of sections 226 and 230 are in the ratio of 0.15:0.95 and the voltages of sections 218 and 224 are still in the ratio of 1:1. There has been a change in the difference in field strengths across sections 224 and 230 which produces a variation in contrast. Since the technique of relative rotation of the electro-optic medium and analyzer, or a third element and the technique of using an external electro-optic device performs a uniform retardation change without permitting redistribution of the field across the electro-optic medium those techniques may be used in real-time applications.

Other embodiments will occur to those skilled in the art and are within the following claims:

We claim:

1. Apparatus for varying the contrast of an image comprising:
    an electro-optic medium having a characteristic which varies as a function of the intensity of an associated electric field;
    means for providing at said electro-optic medium an electric field whose intensity varies as a function of an image whose contrast is to be modified;
    means for uniformly modulating radiation subject to modulation by said characteristic of said electro-optic medium for changing the differences in intensity between points of different intensity of the image; and
    means for detecting the modulation imposed on the radiation, and producing a pattern of radiation representative of said image with contrast modified.

2. The apparatus of claim 1 in which said means for providing includes:
    a photoconductive medium, associated with said electro-optic medium, whose conductivity varies as a function of the intensity of an image incident on it;
    first means for exposing said photoconductive medium to an image to vary the conductivity of said photoconductive medium in a pattern representative of the intensity pattern of said image; and
    means for applying, across said photoconductive medium and said electro-optic medium, an electric field whose intensity varies at said electro-optic medium in a pattern representative of the conductivity pattern of said photoconductive medium.

3. The apparatus of claim 2 in which said means for uniformly modulating includes means for electro-optically modulating radiation subject to modulation by said electro-optic medium.

4. The apparatus of claim 2 in which said means for uniformly modulating includes means for optically modulating radiation subject to modulation by said electro-optic medium.

5. The apparatus of claim 3 in which said means for electro-optically modulating includes means for controlling the intensity of the electric field established across said electro-optic medium.

6. The apparatus of claim 3 in which said means for electro-optically modulating includes a second electro-optic medium having the same said characteristic, second means for applying an electric field across said second electro-optic medium and second means for controlling the intensity of the electric field across said second electro-optic medium.

7. The apparatus of claim 2 in which said mediums are contained in separate materials arranged as adjacent layers.

8. The apparatus of claim 2 in which said means for applying includes a pair of electrodes connectable to a voltage source and arranged with said mediums between them.

9. The apparatus of claim 2 in which said characteristic of said electro-optic medium is electrically induced birefringence.

10. The apparatus of claim 2 in which said first means for exposing includes polarizing means.

11. The apparatus of claim 10 in which said polarizing means includes a plane polarizer.

12. The apparatus of claim 9 in which said means for detecting and producing includes an analyzer.

13. The apparatus of claim 12 in which said analyzer is a plane polarizer.

14. The apparatus of claim 13 in which said plane polarizer is oriented as a crossed polarizer.

15. The apparatus of claim 9 in which said means for uniformly modulating includes means for controlling the intensity of the electric field across said electro-optic medium.

16. The apparatus of claim 9 in which said means for uniformly modulating includes a second electro-optic medium which exhibits electrically induced birefringence, second means for applying a second electric field across said second electro-optic medium, and second means for controlling the electric field across said second electro-optic medium.

17. The apparatus of claim 12 in which said means for uniformly modulating includes means for providing relative rotational motion between said analyzer and said electro-optic medium.

18. The apparatus of claim 12 in which said means for uniformly modulating includes an optical retardation element and means for providing rotational relative motion between said analyzer and electro-optic medium and said optical retardation element.

19. The apparatus of claim 18 in which said optical retardation element is a half-wave plate.

20. The apparatus of claim 2 in which said photoconductive and said electro-optic mediums transmit the radiation which forms said image.

21. The apparatus of claim 2 in which said means for detecting and producing includes a radiation source and second means for exposing said electro-optic medium to radiation from said radiation source.

22. The apparatus of claim 21 in which said radiation source provides polarized radiation.

23. The apparatus of claim 22 in which said radiation source provides plane polarized radiation.

24. The apparatus of claim 21 in which said second means for exposing includes means for simultaneously directing said image to said photoconductive medium and radiation from said radiation source to said electro-optic medium.

25. The apparatus of claim 21 in which said means for simultaneously directing includes beam joining means for projecting said image to said photoconductive medium and said radiation from said radiation source through said photoconductive medium to said electro-optic medium.

26. The apparatus of claim 2 in which said means for uniformly modulating includes means for reversing the modulation of said radiation subject to modulation by said characteristic of said electro-optic medium.

27. The apparatus of claim 26 in which said means for reversing the modulation includes means for reversing the electric field across said electro-optic medium.

28. The apparatus of claim 27 in which said means for reversing the electric field includes switch means.

29. The apparatus of claim 26 in which said means for reversing the modulation includes means for reversing the retardation of said radiation.

30. A method of varying the contrast of an image comprising:
   providing at an electro-optic medium, having a characteristic that varies as a function of an associated electric field, an electric field whose intensity varies as a function of an image whose contrast is to be modified;
   exposing to said image a photoconductive medium whose conductivity varies as a function of the intensity of an image incident on it to vary the conductivity of said photoconductive medium and the intensity of an electric field associated with said photoconductive medium and an associated electro-optic medium in a pattern representative of said image;
   uniformly modulating radiation subject to modulation by said electro-optic medium; and
   detecting the modulation imposed on the radiation and producing a pattern of radiation representative of said image with contrast modified.